United States Patent Office 3,432,324
Patented Mar. 11, 1969

3,432,324
ANTIMONY AND ARSENIC COMPOUND TREATMENT OF TiO₂ FOR LAMINATE PAPERS
Hans-Joachim Rohrborn, Homberg, Heinrich Clausen, Moers, and Wolfgang Grassmann and Gerhard Valet, Homberg, Germany, assignors to Pigment-Chemie, G.m.b.H., Homberg, Germany, a corporation of Germany
No Drawing. Filed Apr. 22, 1966, Ser. No. 561,302
U.S. Cl. 106—300  5 Claims
Int. Cl. C09c 1/36

This invention relates to the production of titanium dioxide pigments exhibiting improved photochemical stability as opacifying agents in resinous materials.

More particularly, it relates to the treatment of pigmentary rutile $TiO_2$ with small, controlled amounts of a pentavalent arsenic or antimony compound to impart extraordinarily high lightfastness and discoloration resistance to such pigment as a component in paper laminate compositions in which melamine or urea formaldehyde type resins are present.

Titanium dioxide is known to be useful in the production of so-called laminate papers. However, when normal titanium dioxide pigments are used in these applications, the light stability of the papers when saturated with a resin such as melamine and hardened, is unsatisfactory because of an undesired $TiO_2$ discoloration which takes place on exposure of the paper to sunlight. This $TiO_2$ sensitivity toward light in these compositions is strongest when the $TiO_2$ is in anatase form and also exists when it is present in rutile crystallinity.

It is known that certain oxides, for example of zinc and antimony, can be incorporated into the $TiO_2$ crystalline lattice. However, such treatment fails to impart sufficient and requisite lightfastness to the $TiO_2$ whereby the product can be used in laminate papers. Also that $TiO_2$ can be after-treated by precipitating a combination of white hydrated oxides, for example, of trivalent aluminum, tin, antimony and of silicic acid on the $TiO_2$ (German Patent No. 877,649). The coated pigments from this treatment yield paints having improved chalking and weathering resistance but the pigment fails to provide essential and necessary lightfastness characteristics when employed in laminate papers.

In another known after-treatment (U.S. Patent No. 3,035,966) the photostability of $TiO_2$ in melamine resins is increased by calcining pigmentary $TiO_2$ at 650 to 800° C. after treatment with aluminum and silicic acid compounds. Finally French Patent No. 1,302,895 exists which improves upon the latter process by subjecting the twice calcined pigment to a second after-treatment with a water soluble silicate and water soluble salts of aluminum and other metals adapted to form colorless oxides.

It has now been found that $TiO_2$ pigments exhibiting extraordinary lightfastness properties in laminate papers can be directly produced and without recourse to the expensive and time-consuming second calcination and other treatments heretofore contemplated as necessary to stabilize $TiO_2$ color when the pigment is employed in paper laminate applications, by subjecting the pigment-developed or calcined and wet ground titanium dioxide product to treatment with a halide, preferably a chloride, compound of pentavalent arsenic or antimony and thereafter precipitating on the $TiO_2$ a small, controlled amount, that is from 0.3 to 1% by weight, based on the $TiO_2$, of a hydrous oxide of arsenic or antimony, or mixtures thereof. As a result a $TiO_2$ paper pigment is obtained without undertaking a second calcination treatment, the lightfastness properties of which pigment are at least equal to those of a $TiO_2$ product obtained so far only by a second calcination following an after-treatment with $Al_2O_3$ and $SiO_2$.

In carrying out the invention an aqueous slurry suspension of wet ground and graded, previously calcined pigmentary anatase or rutile $TiO_2$, preferably the latter, is formed in a suitable treating vessel, to which, if desired, a small amount of a dispersing agent such as sodium silicate (1% of $SiO_2$ calculated on the $TiO_2$) can be added to improve dispersibility. The resulting slurry is thereafter stirred or agitated for about 15 minutes following which addition can be brought about of the calculated amount of pentavalent arsenic or antimony compound. Thus, sufficient acid As(V) or Sb(V) salt solution, such as $AsCl_5$ or $SbCl_5$, preferably in an amount adequate to provide about 0.5 to one part by weight of pentavalent arsenic or antimony per 100 parts of $TiO_2$, can be incorporated in the slurry. After salt addition, stirring is again effected for about 15 minutes and precipitation of a hydrous arsenic or antimony oxide coating onto the suspended pigment is then undertaken by neutralizing the slurry through addition of a suitable neutralizing agent or mixture, such as an alkali metal or alkaline earth hydroxide or carbonate compound, to adjust the pH value thereof to from 7 to 9. Thus, for example, arsenic precipitation can be induced by adding a calcium salt and sodium hydroxide solution, and antimony precipitation through incorporation of a sodium hydroxide or ammonia solution.

During the precipitation the slurry may be maintained at room temperature, but in obtaining optimum lightfastness results working temperatures between 30 and 90° C. and preferably between 50 and 70° C. are employed. After the precipitation stirring is continued for an additional 15 minutes and the treated pigment is then conventionally recovered from the slurry by filtration. Thereafter it is washed and dried and is then ground to desired particle size preferably in a jet grinding or fluid energy mill.

The pigment thus obtained can then be employed in the preparation of pigmented resinous compositions, especially paper laminates by either impregnating a finished paper with a slurry comprising the oxide coated $TiO_2$ and an amine formaldehyde resin selected from melamine and urea in a solution of water and alcohol. After the impregnated paper has been dried a plurality of sheets of the impregnated paper are superposed and formed into an opacified paper laminate in accordance with known hot pressing techniques. Alternatively the oxide coated pigment can be added to the paper stock used in the manufacture of the paper and the finished pigmented paper impregnated with an alcohol-water solution of the resin, following which a plurality of the sheets of the pigmented resin-impregnated paper can be laminated in accordance with known techniques.

The essential advantage of the invention consists in the preparation of a titanium dioxide pigment extremely fast to light in laminate papers which is obtained without a dual calcination treatment or recourse to a dual aftertreatment. The advantageous effects afforded by the invention in respect to the lightfastness of the $TiO_2$ in laminate papers are shown by the following test:

60 g. of melamine resin powder is mixed well with 30 g. of cellulose powder and 10 g. of pigment. A part of this mixture is compressed in a mold at 145° C. under slight pressure into a tablet. After determination of the luminous reflectance value A, the tablet is exposed under a quartz lamp at a distance of 10 cm. for 2 hr. After exposure the luminous reflectance value A is determined again. The difference of the measurements before and after exposure gives the decrease in brightness.

According to this method by way of comparison the following values are obtained for the decrease in brightness:

(1) Untreated TiO₂ (rutile) _____ 17
(2) With Al₂O₃ and SiO₃ aftertreated TiO₂ (rutile) __ 12
(3) With Sb(III) or As(III) compound respectively
    aftertreated TiO₂ (rutile) _____ 9-11
(4) With Al₂O₃ and SiO₂ aftertreated and once more
    calcined TiO₂ (rutile) _____ 5.5
(5) According to this invention, Sb(V) or As(V)
    aftertreated TiO₂( rutile) _____ 4

The above test, Example 3 shows the insufficient effect of trivalent arsenic and antimony compounds in comparison with a TiO₂ after-treated in accordance with this invention with pentavalent arsenic and antimony compounds. The showing also demonstrates that when pigmentary TiO₂ is treated in accordance with this invention it exhibits a considerably lower discoloration rating than paper laminate products containing prior TiO₂ pigments as an opacifying agent.

To a clearer understanding of the invention the following specific examples are given. These are merely illustrative of and not to be construed as limiting the underlying principles and scope of the invention.

EXAMPLE I

To 1 cu. m. of suspension of wet-ground and graded TiO₂ (rutile) with a solids content of 300 g./l., 30 l. of water glass solution (100 g. SiO₂/l.) is added. After stirring for 15 min., 15 l. of an acid antimony (V) salt solution (SbCl₅) with a content of 200 g. Sb(V)/l. is added. While heating to 60° C., stirring is continued for 15 min. and 25% of sodium hydroxide solution is added, until a pH of 8.5 is attained with precipitation of hydrous antimony oxide onto the TiO₂. After continuing stirring for another 15 min., the precipitate is filtered, washed, dried at about 130° C. and ground in a jet mill.

EXAMPLE II

To 10 l. of a suspension of wet-ground and graded TiO₂ (rutile) with a solids content of about 300 g./l., while stirring 120 ml. of an As(V) salt (AsCl₅) solution with a content of 250 g. of As/l., was added. Subsequently, hydrous arsenic oxide is precipitated onto the TiO₂ by addition of 300 ml. of 20% calcium chloride solution as calcium arsenic. After heating to 70° C., the pH value of the suspension is adjusted to 8 and stirring is continued for 15 min. Thereupon, filtration is carried out and preparation is continued according to Example I.

While the pentachlorides of arsenic and antimony have been mentioned as preferred for use, other pentahalides of these elements including such antimonic and arsenic compounds as SbF₅, SbI₅, AsF₅, and AsI₅, as well as mixtures of the halides mentioned are contemplated as useful herein.

In preparing the pentavalent arsenic or antimony salt solutions utilized herein, arsenic trioxide or antimony trioxide can be dissolved, for example, in an excess of concentrated hydrochloric acid and then oxidized in a known manner with concentrated nitric acid, hydrogen peroxide solution or other gaseous chlorine.

In accordance with the invention, aluminum oxide and silicic acid are not necessary for increasing desired photostability. On the other hand, coprecipitation of small amounts of SiO₂, for example, .5% to 5% on the TiO₂ basis, prove useful, as already noted, for improving dispersibility. Use of compounds of trivalent arsenic and/or antimony afford but a relatively slight stabilizing effect which is similar with compounds of zinc, tin and aluminum in conjunction with SiO₂. This, however, is completely insufficient for TiO₂ pigments to be employed in laminate papers.

We claim:

1. A process for preparing an improved titanium dioxide pigment exhibiting high photochemical stability in resin-containing paper laminate compositions which comprises precipitating a coating of from 0.3 to 1% of a white hydrous oxide of a metal selected from the group consisting of pentavalent arsenic and antimony onto previously calcined pigmentary titanium dioxide particles by neutralizing a slurry suspension of said pigment containing a halide of said pentavalent metals, said percentage amount being by weight and based on the titanium dioxide pigment, and washing, drying and grinding the coated particles.

2. A process in accordance with claim 1 characterized in that the titanium dioxide pigment is rutile and the white hydrous oxide is precipitated from a pentavalent antimony chloride solution.

3. A process according to claim 1 characterized in that the titanium dioxide pigment is rutile and the white hydrous oxide is precipitated from a pentavalent arsenic chloride solution.

4. A process in accordance with claim 1 characterized in that the hydrous metal oxide compound is precipitated from a chloride solution of said metals and while the slurry suspension is maintained at a temperature of from 30 to 90° C.

5. A process in accordance with claim 1 characterized in that the titanium dioxide pigment is rutile, the hydrous metal oxide is precipitated from a chloride solution of said metal while maintaining the slurry suspension at a temperature ranging from 50 to 70° C. and said slurry contains from 0.5 to 5% of silicic acid by weight, based on the TiO₂ present.

References Cited

UNITED STATES PATENTS

| 2,161,755 | 6/1939  | Ancrum _____ 106—300 |
| 2,297,523 | 9/1942  | Allan et al. _____ 106—300 |
| 2,365,135 | 12/1944 | Ancrum _____ 106—300 |

FOREIGN PATENTS 544,283   4/1942   Great Britain.

TOBIAS E. LEVOW, *Primary Examiner.*

S. E. MOTT, *Assistant Examiner.*

U.S. Cl. X.R.

106—308